Jan. 12, 1943.  J. G. HEASLET  2,308,331
TRACK WHEEL SUSPENSION FOR TRACK LAYING TRACTORS
Filed May 2, 1941  2 Sheets—Sheet 1

INVENTOR
James G. Heaslet
BY George Douglas Jones
ATTORNEY

Jan. 12, 1943.  J. G. HEASLET  2,308,331

TRACK WHEEL SUSPENSION FOR TRACK LAYING TRACTORS

Filed May 2, 1941  2 Sheets-Sheet 2

INVENTOR
James G. Heaslet
BY George Douglas Jones
ATTORNEY

Patented Jan. 12, 1943

2,308,331

UNITED STATES PATENT OFFICE 2,308,331

TRACK WHEEL SUSPENSION FOR TRACK-LAYING TRACTORS

James G. Heaslet, Hudson, Ohio, assignor to The Cleveland Tractor Company, Cleveland, Ohio Application May 2, 1941, Serial No. 391,591

4 Claims. (Cl. 305—9)

This invention relates to track laying tractors, and more especially to the supporting means for track wheels of a track laying tractor.

The present invention is preferably adaptable for military or high speed tractors of the track laying type, although the adaptability of this design of track wheel supporting means can be successfully applied to the conventional type of track laying tractors.

In the past it was customary to provide track laying tractors with pivoted side frame members functioning in connection with resilient means associated with the free end of the side frames and the main frame of the tractor. However, when the side frames are secured rigidly to the main frame of the tractor, it is customary to provide a resilient means for the track wheels.

Much research and experimentation has been done on the subject of resilient mounting for track wheels, and it is apparent that no efficient and practical results have been attained. This is evidenced by the fact that all of the track laying tractors manufactured by commercial institutions today, for farm and industrial work, and for military work, are provided with pivoted side frames and non-resilient track wheel mountings.

A track laying tractor having rigidly mounted side frames is unquestionably the most desired type of construction, from an engineering standpoint. This fact is obviously apparent to those who are familiar with the engineering, manufacture and operation of a track laying tractor, due to the difficulty encountered to restrain lateral movement and permit vertical movement of the pivoted side frame, as it must be appreciated that the side frames when in operation are subjected to the most severe abuse of any part of the tractor, especially when operating over rough terrain and under heavy loads.

Therefore, the rigidly connected side frame construction is greatly superior and more desirable than the pivot type construction, as difficulties in design and construction are reduced to a minimum, as well as greatly reduced upkeep and repair costs for the side frames and associated mechanism.

The present invention provides an improved construction for resilient mounted track wheels for track laying tractors, the design of which includes a combination of lever arms associated with the wheel axles, the side frame and a resilient member, the action of which permits free movement of each wheel or pairs of wheels in a vertical plane and provides restraining means from lateral thrusts and twisting of the track wheels.

An object, therefore, of the present invention is to provide track wheels for track laying tractors wherein the supporting members of the said wheels are pivotally associated with a member secured to the side frames and a resilient member tending to normally force the said wheel into intimate contact with the track.

Another object of the present invention is to provide a track wheel mounting, comprising an arm pivotally connected to a bracket forming a part of the side frame of a track laying tractor and a lateral thrust bearing forming the pivot end of the arm, an axle secured to the opposite end of the arm and projecting on each side thereof, on which the bearings of the wheels are journaled.

A further object of the present invention is to provide a track wheel mounting for a track laying tractor, including side frames, depending brackets secured to the side frames, spaced apart transversely positioned shafts secured to the said brackets, lever arms journaled on said shafts and positioned in opposed longitudinal relation, a resilient member, the vertical axis of which is positioned centrally and intermediate the spaced apart shafts and above the same, a bar overlying the arms and centrally pivoted to the resilient member and links connecting the arm and the bar.

A still further object of the present invention is to provide supporting means for track wheels of track laying tractors, wherein the supports are positioned in spaced apart relation and having arms journaled thereon, a resilient member the vertical axis of which is positioned above and centrally of the spaced apart supports, an overhanging bar centrally pivoted to the resilient member, and links connecting the ends of the bar to the arms and near the ends thereof.

Other objects of the invention will appear from the following description taken in connection with the drawings, which form a part of the specification and in which Fig. 1 is a side elevation of the mounting and bogie wheel linkage construction.

Figure 1:
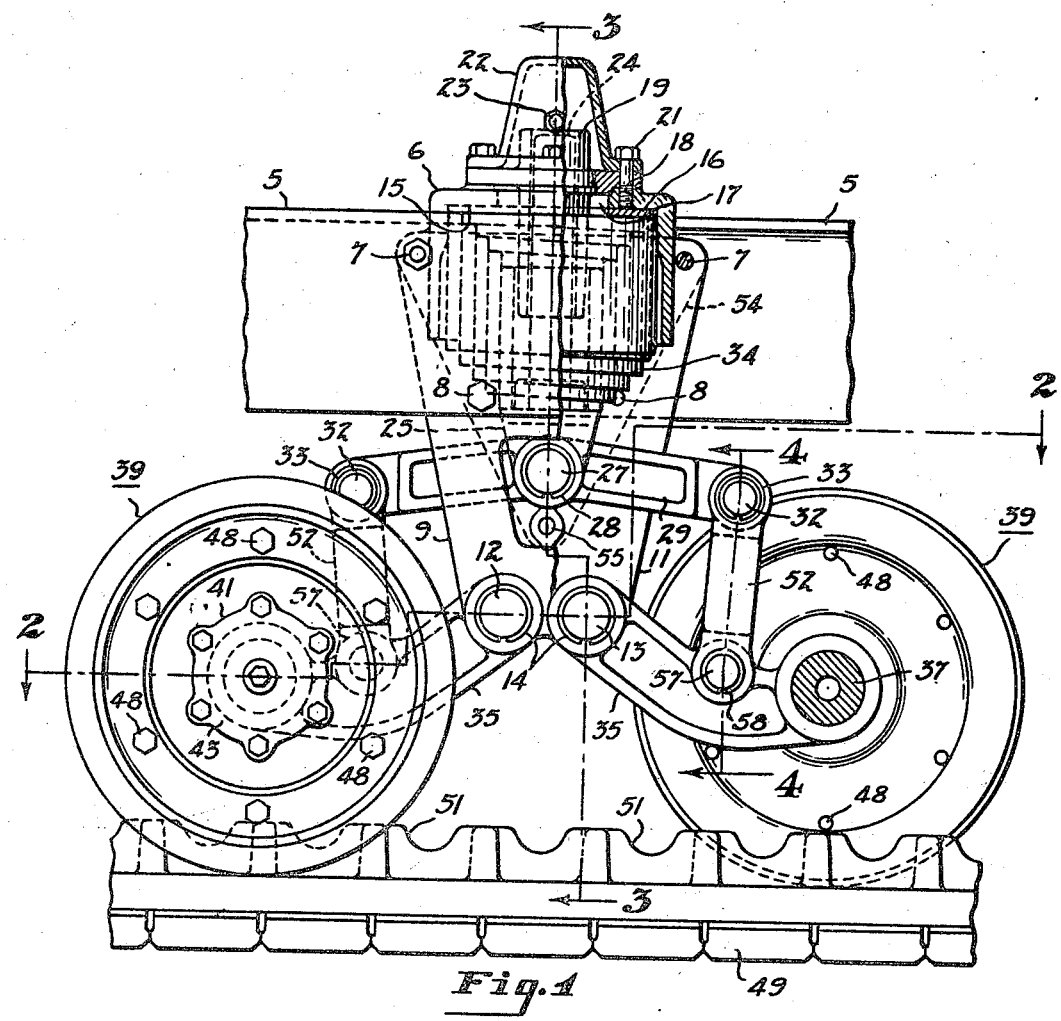

Referring now to the drawings by numerals and reference wherein like numerals correspond to like parts, the side frame of the tractor includes a pair of rigidly mounted spaced apart inverted L shaped members 5, secured in position to a bogie wheel supporting casting 6 by means of through bolts 7 and studs 8, the casting is cup shape in form with a pair of depending legs 9 and 11, the lower ends of which are provided with a pair of transversely spaced apart bores into which are secured shafts 12 and 13, the said shafts being retained therein by means of snap rings 14.

The upper portion of the casting is of annular form, and the cap portion provides seat 15 in which a wear plate 16 is positioned. The cap portion is also provided with an annular opening 17 therethrough, at each side of which are threaded holes 18.

Positioned within the annular opening is a piston guide 19 having an annular bore centrally throughout the length thereof. The said piston guide is secured to the top of the casting 6 by means of cap screws 21 which also secure a dust cap 22, the said dust cap forming a cover and preventing dust from entering the said piston guide. The dust cap is preferably provided with an oil or grease supply filling means 23 which may be conveniently located therein.

Positioned within the bore of the piston guide 19 is a piston 24, the lower end of which has secured thereto a spring support bearing member 25, the piston being preferably welded thereto. Any other suitable securing means may be employed. An annular bore 26 is positioned through the lower portion of the member 25 and in transverse relation to the longitudinal side frames 5. A pin 27 is positioned within the said bore 26 and secured in position by means of a snap rings 28. A centrally pivoted lever arm 29 is provided with a bearing bore 31, the said bore being positioned centrally and intermediate the ends of the arm. The bearing bore is journaled on the pin 27, permitting a vertical rocking movement of the said bar. Each end of the bar 29 is provided with an annular bore into which are secured pins 32 by means of snap rings 33.

Intermediate the spring support bearing member 25 and the wear plate 16 is a volute spring 34 tending to normally force the arm downwardly.

Bogie wheel carrying arms 35—35 are preferably of arcuate shape, one end of which is formed into an elongated bearing 36, having an annular bore therethrough. At the opposite end the said arms are also provided with an annular bore into which axles 37 are secured by welding or any suitable securing means. It should be noted that the said axles project on each side of the arm on which bearings 38 are mounted, and track wheels 39 are carried on the said axles.

Figure 2:
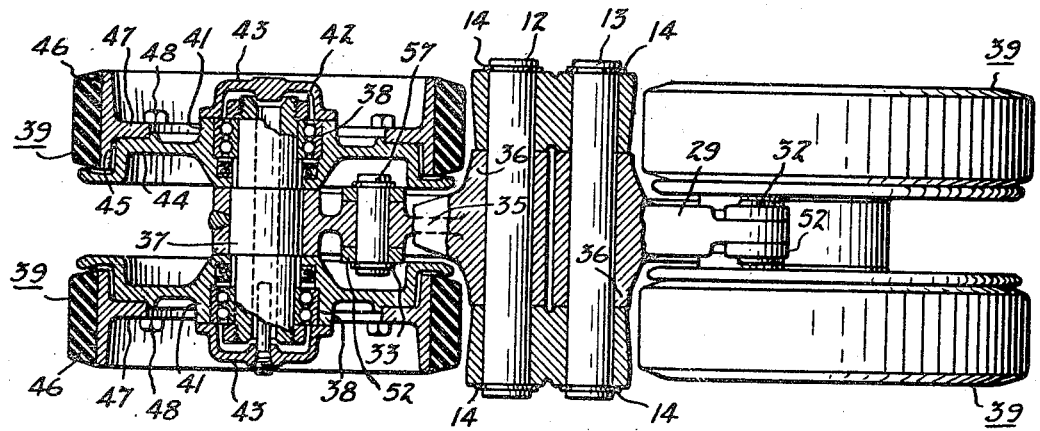
Fig. 2 is a top plan view and fragmental section of the wheels, axles and arms.
Figure 3:
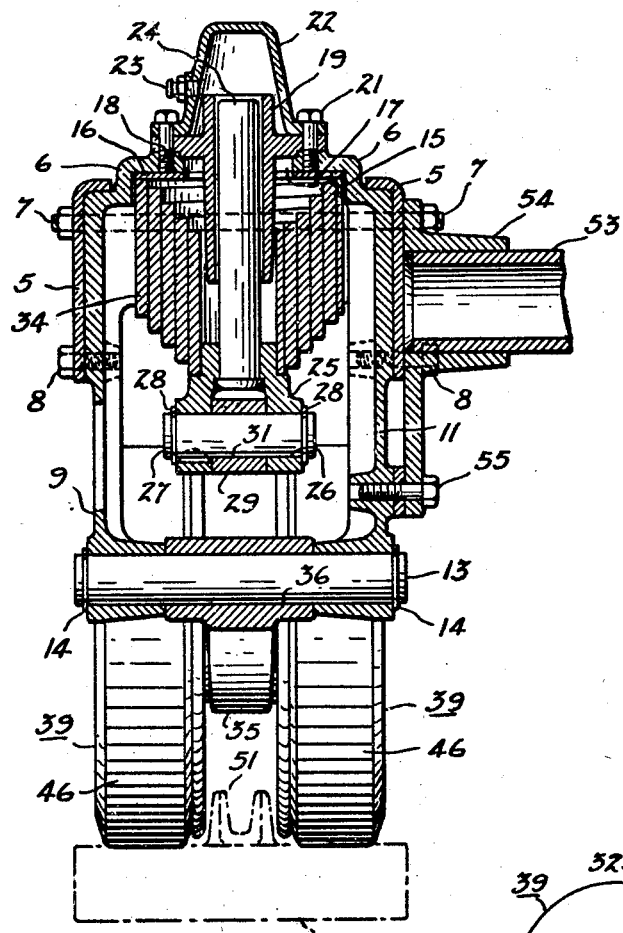
Fig. 3 is a sectional view taken on line 3—3 of Fig. 1.
Figure 4:
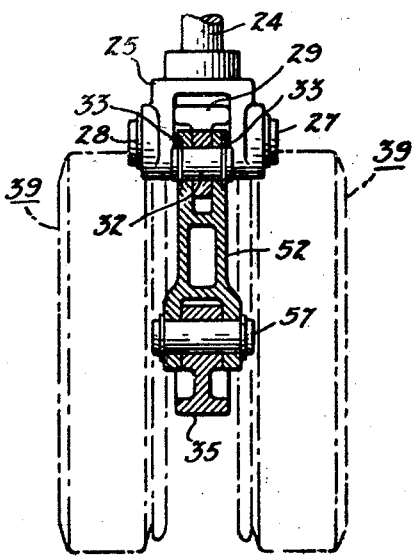
Fig. 4 is a sectional view taken on line 4—4 of Fig. 1.

The said track wheels may be constructed in any desired form such as the wheels illustrated in Fig. 2 which comprise a hub 41 having a raceway into which ball bearings 38 are positioned, and retained by a bearing retainer 42 on the axles 37. A dust cap 43 is secured to the hub by means of cap screws or other holding means.

The disc portion 44 of the hub has its periphery offset forming a seat 45 to provide for a tire 46, the said tire having an inwardly projecting annular flange 47 which is secured to the disk 44 by means of cap screws 48. Rubber or other resilient material may be used as the tread member of the tire, although a metal tread is satisfactory.

The wheels run on a track 49, preferably made of rubber or similar material. It should be noted that the track 49 is provided with metal links 51 which are used as the driving means and function in connection with the drive sprockets of the tractor not shown.

This type of endless track has proved to be the most efficient and satisfactory yet developed. The centrally positioned drive links require a pair of spaced apart track wheels which will straddle the said links. It is, therefore, necessary when using this design of track to employ a pair of spaced apart wheels in order to straddle the links, thus providing stability to the track wheels and their associated mechanism.

Links 52 connect the overlying arm 29 to the arcuate track wheel supporting arms 35 and are pivotally connected thereto by pins 57, which are held in position by snap rings 58, the arms and links forming a parallelogram.

A laterally projecting tractor support bar 53 is rigidly secured to the tractor, the end of the bar being supported in a bracket 54, and preferably welded thereto. The said bracket is secured to the side frame 6 by means of the through bolt 7, and the lower portion thereof to the casting 6 by means of cap screw 55.

Figure 5:
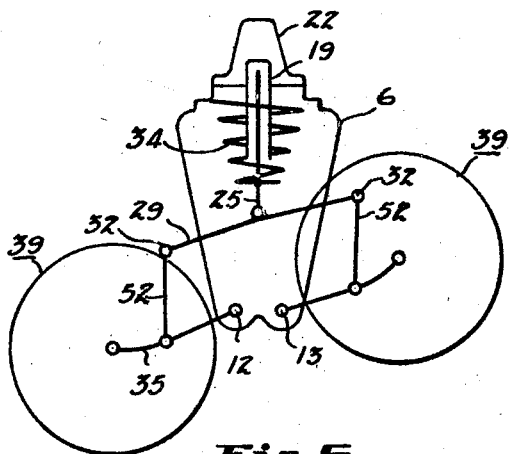
Fig. 5 is a diagrammatical illustration of the linkage action of the bogie wheel mounting.

The diagrammatic illustration, Fig. 5, discloses the action of the track wheels when traveling over rough surfaces, and it should be noted that the links 52 move in a substantially vertical line when the track encounters rough surfaces, thus eliminating any possible binding action of the said linkage.

It should be further noted that any lateral thrust on the tracks will not affect the efficient operation of the bogie wheels, or cause the same to bend out of alignment, or cause the track to become disengaged with the said wheels.

Applicant is fully aware of the prior art relating to spring support and/or resiliently mounted bogie track wheels, all of which fails to illustrate or describe track wheel suspension means that will provide an efficient, stable and inexpensive mechanism suitable for carrying tractors of the track type and withstand the severe abuse encountered by such tractors.

What I claim is:

1. In a suspension for track wheels of a track laying tractor, depending supporting brackets secured to the side frame of the tractor, a pair of longitudinally spaced apart pivots secured to the free end of the brackets, a pair of longitudinally opposed arcuately formed pivot arms journaled to the said pivots, axles secured to the free end of the said arcuate arms and projecting on each side thereof, perpendicularly positioned yielding means abutting the upper portion of the said brackets, the vertical axis of which is intermediate the spaced apart pivots, the lower end of the yielding means being provided with a bearing, a bar overlying the said arcuate arms and centrally journaled in the said bearing, links pivotally connecting the ends of the said bar and the arcuate arms adjacent the ends of the latter, track wheels journaled on the axles and securing means therefor.

2. In a suspension for track wheels of a track laying tractor, depending supporting brackets secured to the side frame of the tractor, a pair of longitudinally spaced apart shafts secured to the free ends of the brackets, a pair of axle carrying arms journaled to the shafts and extending in opposite directions, perpendicularly positioned compressible resilient means associated with the side frame, the vertical axis of which being intermediate the said shafts, a seat for the lower end of the resilient means provided with a bearing, a bar overlying the arms and centrally journaled in the last mentioned bearing, links pivotally connecting the ends of the bar and the arms centrally of the latter, axles positioned in the free end of the arms and projecting on either side thereof, track wheels journaled on the axles and securing means therefor whereby the arms and links lie in a plane intermediate the track wheels.

3. In a suspension for track wheels of a track laying tractor, depending brackets secured to the side frame, longitudinally spaced apart bearings in the lower ends thereof, track wheel carrying arms journaled in the bearings and extending in opposite directions, a compressible resilient member secured to the said depending brackets, the vertical axis of which is intermediate the said bearings, a seat for the lower end of the resilient member, a bearing in the seat, an overlying bar centrally journaled in the last mentioned bearing and links pivotally connected to the free ends of the bar and carrying arms intermediate the ends thereof.

4. In a suspension for track wheels of a track laying tractor, depending supporting brackets secured to the side frame of the tractor, a pair of horizontal, spaced apart shafts secured to the free end of the brackets, a pair of axle carrying arms journaled on the shafts, each arm extending in opposite directions, track wheels journaled on the axles, perpendicularly positioned resilient means associated with the side frame and intermediate the vertical axis of the spaced apart shafts, a seat for the lower end of the resilient means having a bearing, a bar overlying the arms and centrally journaled in the said bearing, links pivotally connecting the ends of the bar and the carrying arms intermediate the ends thereof, thereby permitting independent movement of the track wheels in a vertical plane.

JAMES G. HEASLET.